United States Patent

Haartsen

[11] Patent Number: 5,870,673
[45] Date of Patent: Feb. 9, 1999

[54] METHODS AND SYSTEMS FOR CONCURRENT RECEIPT OF INCOMING CALLS FROM A WIDE AREA CELLULAR NETWORK AND A PRIVATE RADIO COMMUNICATIONS NETWORK

[75] Inventor: Jacobus Cornelis Haartsen, Staffanstorp, Sweden

[73] Assignee: Telefonaktiebolaget LM Ericsson, Stockholm, Sweden

[21] Appl. No.: 708,035

[22] Filed: Aug. 30, 1996

[51] Int. Cl.[6] .................................................. A63B 69/00
[52] U.S. Cl. ......................... 455/426; 455/426; 455/422; 455/448; 455/425; 455/462; 455/464; 455/463; 455/434; 455/575; 455/552; 455/553; 455/554; 455/574
[58] Field of Search ..................................... 455/426, 422, 455/448, 425, 462, 464, 463, 434, 552–554, 575, 574

[56] References Cited

U.S. PATENT DOCUMENTS

| | | | |
|---|---|---|---|
| 5,109,528 | 4/1992 | Uddenfeldt | 455/33.2 |
| 5,260,988 | 11/1993 | Schellinger et al. | 379/59 |
| 5,392,462 | 2/1995 | Komaki | 455/343 |
| 5,428,668 | 6/1995 | Dent et al. | 379/59 |
| 5,504,803 | 4/1996 | Yamada et al. | 455/542 |
| 5,550,895 | 8/1996 | Burson et al. | 455/56.1 |
| 5,590,396 | 12/1996 | Henry | 455/343 |

*Primary Examiner*—Donnie L. Crosland
*Attorney, Agent, or Firm*—Myers Bigel Sibley & Sajovec, PA

[57] ABSTRACT

Concurrent receipt of incoming calls from both a private radio communications network connected to a public switched telephone network and a wide area cellular network also connected to the public switched telephone network are provided by a radio communications mobile terminal supporting concurrent receipt of incoming calls from the two uncoordinated networks. The mobile terminal wakes up from a lower power sleep mode to monitor for paging messages on the paging channel of the wide area cellular network. The mobile terminal also wakes up to monitor for beacon transmissions from the private radio communications network on the beacon channel of the private radio communications network. When incoming calls are indicated as pending in either network, the mobile terminal accesses the network having an incoming call and receives the call. The mobile terminal may optionally deregister from the wide area cellular network when it establishes access to a private radio communications network and only periodically wake up from its lower power sleep mode to monitor for incoming calls on both the wide area cellular network and the private radio communications network.

18 Claims, 7 Drawing Sheets

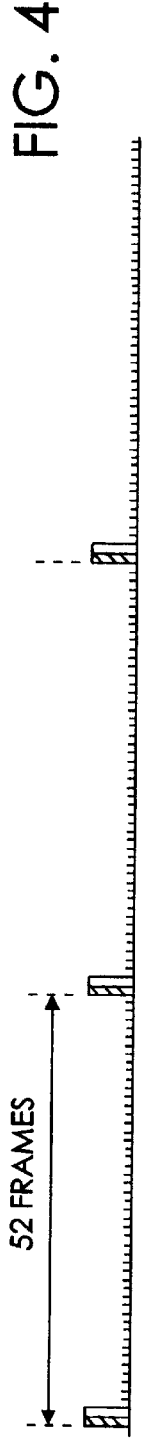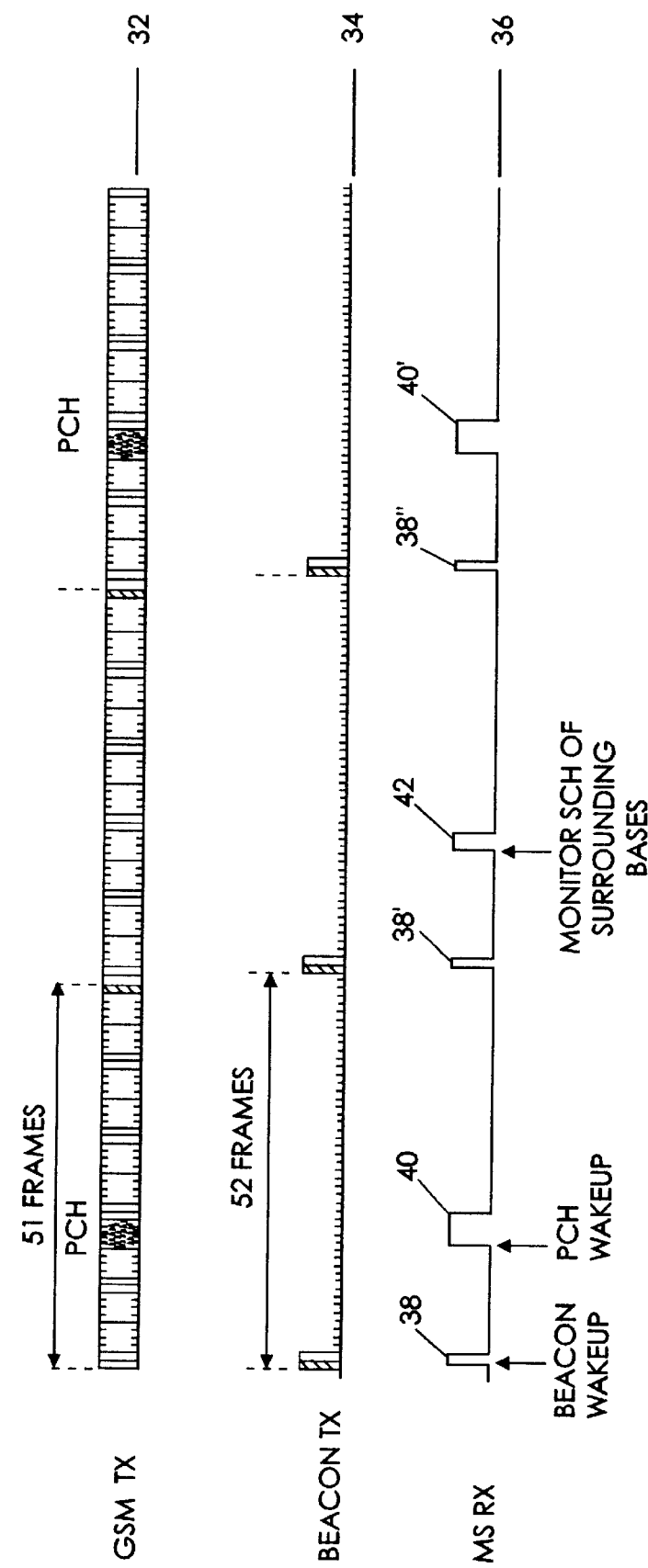

METHODS AND SYSTEMS FOR CONCURRENT RECEIPT OF INCOMING CALLS FROM A WIDE AREA CELLULAR NETWORK AND A PRIVATE RADIO COMMUNICATIONS NETWORK

FIELD OF THE INVENTION

This invention relates to communication systems and more particularly to private radio communication networks within the coverage area of a wide area cellular network.

BACKGROUND OF THE INVENTION

Public cellular networks (public land mobile networks) are commonly employed to provide voice and data communications to a plurality of subscribers. For example, analog cellular radiotelephone systems, such as designated AMPS, ETACS, NMT-450, and NMT-900, have been deployed successfully throughout the world. More recently, digital cellular radiotelephone systems such as designated IS-54B in North America and the pan-European GSM system have been introduced. These systems, and others, are described, for example, in the book titled *Cellular Radio Systems* by Balston, et al., published by Artech House, Norwood, Mass., 1993.

Traditional analog radiotelephone systems generally employ a system referred to as frequency division multiple access (FDMA) to create communications channels. As a practical matter well-known to those skilled in the art, radiotelephone communications signals, being modulated waveforms, typically are communicated over predetermined frequency bands in a spectrum of carrier frequencies. These discrete frequency bands serve as channels over which cellular radiotelephones communicate with a cell, through the base station or satellite serving the cell. In the United States, for example, Federal authorities have allocated to cellular communications a block of the UHF frequency spectrum further subdivided into pairs of narrow frequency bands, a system designated EIA-553 or IS-19B. Channel pairing results from the frequency duplex arrangement wherein the transmit and receive frequencies in each pair are offset by 45 Mhz. At present there are 832, 30-Khz wide, radio channels allocated to cellular mobile communications in the United States.

The limitations on the number of available frequency bands present several challenges as the number of subscribers increases. Increasing the number of subscribers in a cellular radiotelephone system generally requires more efficient utilization of the limited available frequency spectrum in order to provide more total channels while maintaining communications quality. This challenge is heightened because subscribers may not be uniformly distributed among cells in the system. More channels may be needed for particular cells to handle potentially higher local subscriber densities at any given time. For example, a cell in an urban area might conceivably contain hundreds or thousands of subscribers at any one time, easily exhausting the number of frequency bands available in the cell.

For these reasons, conventional cellular systems employ frequency reuse to increase potential channel capacity in each cell and increase spectral efficiency. Frequency reuse involves allocating frequency bands to each cell, with cells employing the same frequencies geographically separated to allow radiotelephones in different cells to simultaneously use the same frequency without interfering with each other. By so doing, many thousands of subscribers may be served by a system of only several hundred frequency bands.

Another technique which may further increase channel capacity and spectral efficiency is time division multiple access (TDMA). A TDMA system may be implemented by subdividing the frequency bands employed in conventional FDMA systems into sequential time slots. Although communication on frequency bands typically occur on a common TDMA frame that includes a plurality of time slots, communications on each frequency band may occur according to a unique TDMA frame, with time slots unique to that band. Examples of systems employing TDMA are the dual analog/digital IS-54B standard employed in the United States, in which each of the original frequency bands of EIA-553 is subdivided into 3 time slots, and the European GSM standard, which divides each of its frequency bands into 8 time slots. In these TDMA systems, each user communicates with the base station using bursts of digital data transmitted during the user's assigned time slots.

A channel in a TDMA system typically includes one or more time slots on one or more frequency bands. As discussed above, traffic channels are used to communicate voice, data or other information between users, for example, between a mobile terminal such as a radiotelephone and a network base station. In this manner, each traffic channel forms one direction of the duplex communications link established by the system from one user to another. Traffic channels typically are dynamically assigned by the system when and where needed. In addition, systems such as the European GSM system, may "frequency hop" traffic channels, i.e., randomly switch the frequency band on which a particular traffic channel is transmitted. Frequency hopping reduces the probability of interference events between channels, using interferer diversity and averaging to increase overall communications quality.

Typically included in the dedicated control channels transmitted in a cell are forward control channels which are used to broadcast control information in a cell of the wide area cellular network to radiotelephones which may seek to access the network. The control information broadcast on a forward control channel may include such things as the cell's identification, an associated network identification, system timing information and other information needed to access the wide area cellular network from a radiotelephone.

Forward control channels, such as the Broadcast Control Channel (BCCH) of the GSM standard, typically are transmitted on a dedicated frequency band in each cell. A radiotelephone seeking access to a system generally "listens" to a control channel in standby mode, and is unsynchronized to a base station or satellite until it captures a base station or satellite control channel. In order to prevent undue interference between control channels in neighboring cells, frequency reuse is conventionally employed, with different dedicated frequency bands being used for the control channel in neighboring cells, according to a frequency reuse pattern that guarantees a minimum separation between cochannel cells. Frequency hopping, which might allow denser reuse of control channel frequency bands, is typically not employed because an unsynchronized radiotelephone generally would have difficulty capturing a frequency-hopped control channel due to lack of a reference point for the frequency hopping sequence employed. Moreover, for private uncoordinated radio communications systems, a frequency reuse pattern cannot be used because each private radio communications system typically operates independently of other potentially interfering systems including the wide area cellular network.

The past decades have shown a considerable rise in the deployment of mobile telephony. With a slow start of the analog standards like AMPS, NMT and TACS, mobile telephony has really hit the consumer markets with the advanced digital standards incorporating TDMA like GSM and D-AMPS. In addition to progress in mobile terminal features like size and battery life, much progress has been made at the network side as well. Increasingly dense cell reuse plans have been complemented with hierarchical cell structures, where macrocells cover entire districts, microcells cover smaller parts like streets, and picocells cover very small areas the size of a few rooms. Important for the hierarchical cell structure is that each base station deployed (ranging from macro to pico base stations) is part of the same Public Land Mobile Network (PLMN), also referred to as a wide area cellular network. When a mobile user wanders from a macrocell to a microcell area, the call can be handed off from a macro base station to a micro base station without the user noticing it. This is particularly true for digital phone systems that apply TDMA: being handed off from one base station to another within a coordinated wide area cellular network for the mobile phone usually only involves the change of a time slot.

Recently, private radio communications networks for residential and business areas are being developed that use the same air-interface as the public cellular network, but do not form an integrated part with the overlaying public cellular network. In this sense, these private systems are not micro or pico networks since there is no direct connection between these private systems and the public cellular network. For example, for residential usage, private base stations can be used as described in U.S. Pat. No. 5,428,668 which only connect to the PSTN (or ISDN) wired network. In business or office networks applying a Private Branch Exchange ("PBX"), radio base stations belonging to the same private network communicate with each other, but none of them communicates directly with the overlaying wide area cellular network. A mobile terminal in range of a private communications network typically preferably enters a private mode attaching to the private communications network to enjoy benefits such as lower tariffs, longer talk and stand-by time, and better voice quality.

However, in such systems, the mobile terminal, once it accesses the private communications network, typically cannot receive incoming calls from the wide area cellular network. While it has been suggested to resolve this problem by providing for call forwarding in the wide area cellular network to the PSTN number of the private radio communications network when the mobile terminal is connected to the private radio communications network, this is not always desirable. For example, there may be occasions where call forwarding from the wide area cellular network number to the PSTN number of the private radio communications network is not available. Furthermore, some wide area cellular networks employ a short message service (SMS) which is not defined on wired networks and, accordingly, such short messages are not presently forwarded through call forwarding.

SUMMARY OF THE INVENTION

It is, therefore, an objective of the present invention to resolve the problem of providing a mobile terminal capable of receiving incoming calls or messages from a wide area cellular network while the mobile terminal is attached to a private radio communications network. To solve the problem of receiving calls from both a wide area cellular network and a private radio communications network, the present invention provides a mobile terminal for receiving incoming calls, either voice or message, both in the wide area cellular network and the private radio communications network. The mobile terminal periodically wakes up from a power saving sleep mode to monitor for paging messages at the appropriate time on the cellular paging channel ("PCH"). The mobile terminal also wakes up periodically to monitor for the radio beacon signals transmitted by a private radio communications network base station.

Because the wide area cellular network and the private radio communications network generally are uncoordinated, the timing of the wide area cellular network paging channel and the private radio communications network radio beacon transmission will generally be unsynchronized and typically will slide relative to each other periodically. Accordingly, the time for monitoring each signal may occasionally conflict. Given that the transmission frequency for the paging channel and the beacon transmission will typically be distinct frequencies to reduce the likelihood of interference between the signals and that the mobile terminal typically is not provided with redundant radio communications receiving circuitry, the present invention provides for placing priority on monitoring for either the wide area cellular network paging channel or the private radio communications network beacon transmission on any occasion where the time for monitoring each overlaps. This conflict may only occur for a short moment and the likelihood of conflict will be reduced when the duty cycle of the paging channel and/or the beacon transmission decreases. Operations of the mobile terminal where the terminal wakes up for short times to monitor for both the paging channel and beacon transmissions is referred to herein as a dual monitor mode.

When a beacon transmission indicating an incoming call on the private radio communications network is received, the mobile terminal accesses the private radio communications network according to that network's protocol. Likewise, when a paging message is received from the wide area cellular network indicating either an incoming call or a short message service message, the mobile terminal enters the cellular mode and accesses the wide area cellular network according to that network's standard procedures.

In one embodiment of the present invention, a mobile terminal having a sleep mode is provided including receiving means for receiving beacon transmissions and paging message transmissions. A page monitoring means operatively connected to the receiving means receives paging message on the wide area cellular network at a first predetermined time corresponding to the paging channel of the wide area cellular network. A beacon monitoring means, also operatively connected to the receiving means, monitors for beacon transmissions from the private radio communications network at a second predetermined time corresponding to the beacon channel of the private radio communications network. Activating means responsive to the page monitoring means and beacon monitoring means wakes the mobile terminal from a power saving sleep mode at the first predetermined time and the second predetermined time to monitor for the respective signals. Selecting means is provided to selectively operatively connect the page monitoring means or the beacon monitoring means to the receiving means when a collision occurs, i.e., when the first predetermined time and the second predetermined time conflict.

In another aspect of the present invention, the mobile terminal further includes transmitting means for transmitting radio communications to the wide area cellular network and to the private radio communications network. A cellular network access means is operatively connected to the transmitting means and responsive to the page monitoring means to access the wide area cellular network when a paging message is received indicating receipt of an incoming call (which may be voice or message) on the wide area cellular network. A private network accessing means, also operatively connected to the transmitting means, which is responsive to the beacon monitoring means accesses the private radio communications network when a beacon transmission is received indicating receipt of an incoming call on the private radio communications network.

Also provided are methods for concurrent receipt by a mobile terminal of incoming calls from both a private radio communications network having a beacon channel and a wide area cellular network having a paging channel. The mobile terminal monitors for paging messages from the wide area cellular network at a first predetermined time corresponding to the paging channel of the wide area cellular network. It further monitors for beacon transmissions from the private radio communications network at a second predetermined time corresponding to the beacon channel of the private radio communications network. When the first predetermined time corresponding to the paging channel and the second predetermined time corresponding to the beacon channel conflict, the mobile terminal selects between monitoring for paging messages and monitoring for beacon transmissions.

When a paging message is received indicating receipt of an incoming call (voice or message) on the wide area cellular network, the mobile terminal accesses the wide area cellular network. When a beacon transmission is received indicating receipt of an incoming call on the private radio communications network, the mobile terminal accesses the private radio communications network. Power saving for the mobile terminal is provided by waking up the mobile terminal at the first predetermined time and the second predetermined time to execute the monitoring steps. The mobile terminal is then returned to the sleep mode if no paging or beacon messages are received in the monitoring steps.

In one embodiment of a method of the present invention, the mobile terminal deregisters from the wide area cellular network for voice calls while in a private mode monitoring a private radio communications network. Voice calls over the wide area cellular network may then be forwarded to the wire line number of the private radio communications network. The mobile terminal continues dual monitor operations by periodically monitoring for short message service transmissions from the wide area cellular network at a predetermined short message service transmission time interval.

In another embodiment of a method according to the present invention, in addition to deregistering from the wide area cellular network for voice calls, the mobile terminal also deregisters for short message service messages. The mobile terminal then suspends monitoring for paging messages from the wide area cellular network and exits dual monitor mode for a period of time. To receive incoming messages or calls which for some reason have not been forwarded from the wide area cellular network number to the wire line number of the private radio communications network, the mobile terminal periodically returns to the dual monitor mode by registering with the wide area cellular network and then monitoring for paging messages from the wide area cellular network.

Accordingly, the dual page monitor operations of the present invention address the problem of receiving incoming calls on both a wide area cellular network and a private radio communications network by providing mobile terminals and methods for using the same which periodically wakes to monitor for paging messages/beacon transmissions from the respective networks. The mobile terminal is thereby able to receive calls from the private radio communications network while concurrently monitoring the wide area cellular network to receive paging messages indicating incoming unforwarded voice calls or incoming messages. The mobile terminal may either maintain registration with both systems and execute dual monitor operations at all times or forward voice calls from the wide area cellular network and use dual monitor only to receive messages on the wide area cellular network or, finally, may entirely deregister from the wide area cellular network when it is connected to a private radio communications network and only periodically enter a dual monitor mode to receive messages or unforwarded calls.

BRIEF DESCRIPTION OF THE DRAWINGS

FIG. 4 graphically illustrates a radio beacon transmission channel for a private radio communications network;

FIG. 5 graphically illustrates dual page mode synchronization in a mobile terminal according to the present invention;

DETAILED DESCRIPTION OF THE INVENTION

Figure 1:
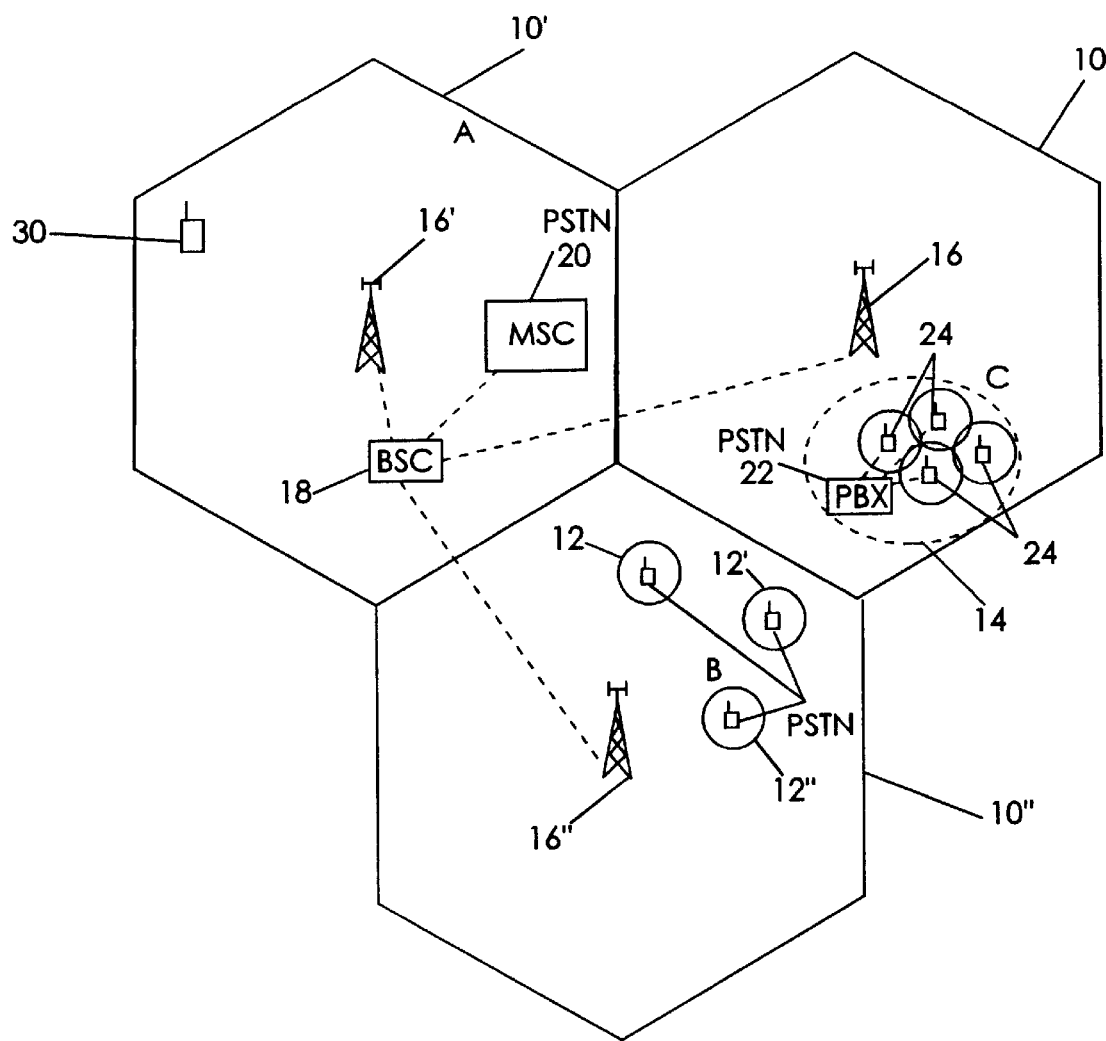
FIG. 1 schematically illustrates a portion of a wide area cellular network including private radio communications networks within the coverage area of the wide area cellular network.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Referring now to FIG. 1, an operating environment of the present invention will be described. The present invention relates to mobile terminals and methods for using the same within hierarchial cell structures of wide area cellular networks such as advanced cellular phone systems, for example, in order to increase capacity in densely populated areas. Hierarchial cell structures are typically designed around macrocells 10, 10', 10" covering cells with radii which may be in the order of a few kilometers. Macrocells 10, 10', 10" define the cellular structure of the wide area cellular network or PLMN as is well known and will be understood by one of ordinary skill in the art.

Also illustrated in FIG. 1 are office private radio communications network 14 and residential private radio communications network 12, 12', 12". Residential network 12, 12', 12" may include a private base station such as those described in U.S. Pat. No. 5,428,668, which is incorporated herein by reference as if set forth in its entirety. Residential network 12, 12', 12" and office network 14 are private radio communications networks which have wire line connections to the public switched telephone network ("PSTN") via a PSTN switch or exchange (not shown) and/or to an ISDN wired network. Accordingly, office network 14 and residential network 12, 12', 12" have an associated wire line number by which they communicate over the public switched telephone network (or ISDN).

As illustrated in FIG. 1, the distinction between private radio communications networks 12, 12', 12", and 14 is that the office network typically interfaces to the public switched telephone network by a private branch exchange ("PBX") and includes multiple base stations. Office network 14 as illustrated in FIG. 1 is a private radio communications network which connects to the PSTN via private branch exchange ("PBX") 22. Office network 14 further includes base stations 24. Office network 14 and base stations 24 typically are not controlled by the wide area cellular network as they are not a coordinated part of the wide area cellular network. In addition, signaling through the PSTN line to PBX 22 may create problems when a call on the PSTN line is in progress. For purposes of the present invention, the distinctions between office and residential private radio communications networks are not critical and the invention will be described herein with reference to private radio communications network 12. However, it is to be understood that the benefits of the present invention can be obtained regardless of the type of uncoordinated private radio communications network.

As illustrated in FIG. 1, macrocells 10, 10', 10" of the wide area cellular network each include at least one base station 16, 16', 16". Base stations 16, 16', 16" are connected via a wired infrastructure as is known to those of ordinary skill in the art. As illustrated in FIG. 1, the wired infrastructure includes base station controller 18 and mobile services switching center 20. The particulars of the infrastructure of the wide area cellular network will not be discussed further herein except to note that the wired infrastructure of the wide area cellular network also includes a connection to the PSTN providing the public land mobile network access to the PSTN switch (not shown) (or, alternatively, to an ISDN).

When a mobile terminal user travels in the cellular area of the wide area cellular network, the user's connection is handed off between base station 16, 16', 16" depending upon the mobile-to-base distance and the interference situation. This assures that the mobile terminal user keeps a high quality channel even as the user moves from one cell to the other. Because base stations 16, 16', 16" are all interconnected, methods for controlling base station 16, 16', 16" transmission and re-routing of calls from one base station 16, 16', 16" to another in order to maintain a high quality channel (handover) is known in current wide area cellular networks.

Mobile terminal 30 operating within the environment illustrated in FIG. 1 may be described as having two operating modes. In the cellular mode, it acts like an ordinary cellular terminal interacting with the wide area cellular network. In the private mode, it acts like a private cordless phone interacting with the base station of private radio communications network 12. However, as described in U.S. Pat. No. 5,428,668, the operations of mobile terminal 30 in the private mode are beneficially carried out at cellular frequencies. Furthermore, in accordance with the present invention, mobile terminal 30 operates using time division multiple access (TDMA) framing structures compatible with those of the wide area cellular network.

While mobile terminal 30 has separate operating modes for cellular and private access, it is advantageous for mobile terminal 30 to receive incoming calls from the wide area cellular network even when in the private mode. This is particularly true for the short message service (SMS), which is a defined service available in certain wide area cellular networks but undefined for wire line networks. It is also desirable to receive calls from the wide area cellular network in situations where it is not desired to have call forwarding from the wide area cellular number to the PSTN number of private radio communications network 12. Therefore, during the private idle mode (or during short intervals in the private idle mode) it is desired that mobile terminal 30 monitors the wide area cellular network paging channel in addition to beacon transmissions from private radio communications network 12. For purposes of understanding the present invention, the wide area cellular network will be described based on the GSM cellular system standard.

Figure 2:
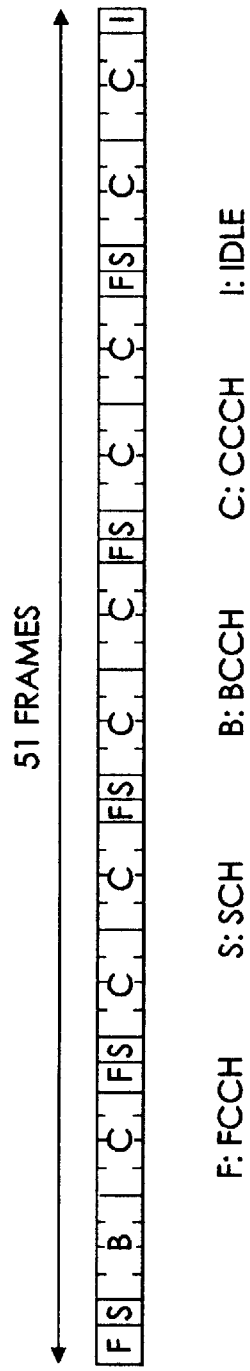
FIG. 2 graphically illustrates a GSM broadcast channel.

Referring now to FIG. 2, the framing of the broadcast channel in GSM is illustrated. As illustrated in FIG. 2, the broadcast channel in GSM is based upon a 51-frame multi-frame. The frequency control channel (FCCH) designated F in FIG. 2 is used for frequency synchronization between the wide area cellular network base station 16 and mobile terminal 30. The synchronization channel (SCH) designated S in FIG. 2 is used for a time synchronization between wide area cellular network base station 16 and mobile terminal 30. The common control channels (CCCH) designated C in FIG. 2 are used for paging and access control.

The paging channel (PCH) of the wide area cellular network typically uses four consecutive frames of the CCCH. The position of the PCH is determined by the paging group which is derived from the International Mobile Subscription Identity (IMSI). The period of occurrence of the PCH can be set by the operator of the wide area cellular network at between two and nine 51-frame multi-frames. Therefore, in a GSM system as illustrated, the highest PCH rate is once every two 51-frame multi-frames.

Figure 3:
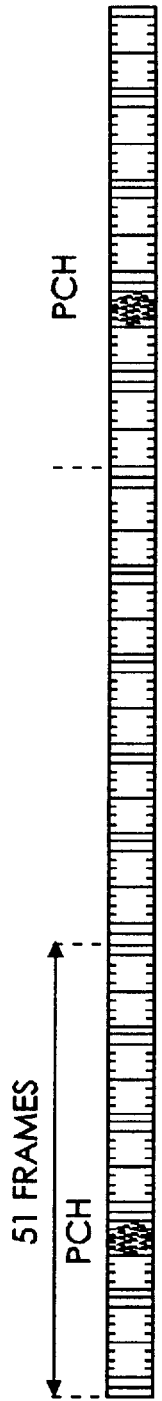
FIG. 3 graphically illustrates a GSM paging channel.

A PCH transmission framing for the two multi-frame embodiment is illustrated in FIG. 3. As illustrated in FIG. 3, the PCH occupies four frames of one CCH every other 51-frame multi-frame. Mobile terminal 30 may have a lower (compared to its active mode) power sleep (idle) mode allowing power savings during idle frames when no communication activity is underway. During normal wide area cellular network operations, mobile terminal 30 in the cellular sleep mode wakes up during its designated PCH channel events and occasionally may also wake up to receive the SCH of other GSM base stations 16', 16" in order to monitor their signal strengths.

Referring now to FIG. 4, the framing for an embodiment of a private radio communications network radio beacon is illustrated. The beacon transmission may contain a paging message. The private radio communications system beacon preferably includes an identification of the base station of the private radio communications network 12 and may also include status information. In the embodiment illustrated in FIG. 4, the beacon transmission is provided as a beacon channel in a TDMA frame structure having 26-frame multi-frames. As with the wide area cellular network paging channel, the beacon channel may occur once every N×26 frame multi-frames where N is an integer greater than 1. In the illustration of FIG. 4, the radio beacon timing is illustrated for N=2. It is to be understood that the benefits of the present invention may be obtained for an FDMA-based private radio communications network with a repeating periodic radio beacon transmission which may be time synchronized to and monitored by mobile terminal 30. However, the benefits of the present invention are primarily directed to receiving incoming calls from a wide area cellular network while mobile terminal 30 is connected to a TDMA-based private radio communications network 12 such as that illustrated in FIG. 4.

The beacon transmission from private radio communications network 12 may be implemented as a simplified version of the mobile terminal access protocol of a network protocol such as GSM. For example, the beacon transmission from private radio communications network 12 could include an FCCH for frequency synchronization as with GSM followed by a beacon channel BCH transmission. Both the private radio communications network FCCH and BCH could be transmitted on a periodic basis such as the 2×26 frame TDMA multi-frames illustrated in FIG. 4. The BCH slot placement relative to the FCCH could be varied from that used in the GSM wide area cellular network so that the private radio communications network beacon transmission would not be mistaken for an FCCH and SCH pair from the wide area cellular network.

Unlike in the GSM protocol, the BCH frame may include identification and status information rather than simply providing time synchronization. For example, the BCH could include a beacon identity including a network color code and a base color code to provide a unique identifier to a specific base of a private radio communications network 12 for either a residential network 12 or office network 14.

Mobile terminal 30 according to the present invention in the private idle mode (or sleep mode) wakes up during the beacon events. For mobile terminal 30 to receive incoming calls from both private radio communications network 12 and the wide area cellular network base station 16, it wakes up during both the GSM PCH and the radio beacon transmission of the private radio communications network in accordance with the present invention. While in the private idle mode, mobile terminal 30 remains synchronized to both the wide area cellular network and private radio communications network 12. Therefore, when it "wakes up" from sleep mode it is fully synchronized to monitor for pages and/or beacons.

Mobile terminal 30 is synchronized to the wide area cellular network based on a search for cellular synchronization signals initiated when mobile terminal 30 is powered on. In known methods for wide area cellular networks, it may then enter a cellular standby mode where it remains synchronized to the cellular system but sleeps most of the time only waking up to monitor and decode PCH (paging) messages from the wide area cellular network. Mobile terminal 30, when in range of private radio communications network 12, will also wake up and scan for a beacon allowing mobile terminal 30 to recognize that it has access to private radio communications network 12 and register on private radio communications network 12. As will be described further herein, once mobile terminal 30 is registered with private radio communications network 12, it may or may not deregister from the wide area cellular network for voice and/or short message service messages. While attached to private radio communications network 12, mobile terminal 30 is in private mode and if no calls are made, it may enter a private standby mode or sleep mode in which it also remains synchronized to private radio communications network 12. It may then monitor for beacons from private radio communications network 12 or paging messages from the wide area cellular network indicating receipt of an incoming call as will be described further herein.

An embodiment of the operations of the system of the present invention executing dual monitor mode operations is illustrated in FIG. 5. As illustrated in FIG. 5, the paging channel transmission of an embodiment of a GSM wide area cellular network is illustrated at 32. The beacon transmission timing of a private radio communications network 12 as described in connection with FIG. 4 previously is illustrated at 34. The dual monitor mode operations of mobile terminal 30 according to the present invention for the illustrated embodiment is shown at 36.

At times 38, 38', 38", mobile terminal 30 wakes up from the sleep mode to monitor for beacon transmissions from private radio communications network 12. At times 40, 40', mobile terminal 30 wakes up from its sleep mode to monitor for paging messages from the wide area cellular network base station 16. Also illustrated in FIG. 5 at 42 is a wake up for mobile terminal 30 to monitor the SCH of other base stations 16', 16" of the wide area cellular network. The different multiframe structure between the wide area cellular network and private network, i.e. N×51 and M×26, respectively in the illustrated examples, provides a natural sliding effect between the PCH transmissions of the wide area cellular network and the beacon transmissions of private radio communications network 12. This sliding reduces or eliminates the potential for consecutive conflicting transmissions.

It may be desirable for mobile terminal 30 to wake up to monitor other GSM base stations 16', 16" for cell reselection purposes. However, since private radio communications network 12 is typically located within one cell 10, 10', 10" of the wide area cellular network and generally is only accessible to mobile terminal 30 while mobile terminal 30 is within the corresponding cell 10, 10', 10" of the wide area cellular network, it is generally unnecessary for mobile terminal 30 to carry out cell reselection operations while mobile terminal 30 is attached to private radio communications network 12.

As one of the purposes of utilizing private radio communications network 12 is typically to extend the battery life of mobile terminal 30, it is desirable for the paging or beacon activity of private radio communications network 12 and the wide area cellular network to be minimized. This may be accomplished by having a large N defining the beacon transmission timing in the private radio communications network 12 and further by having a large PCH period in the wide area cellular network. However, N in the private radio communications network 12 cannot be too long because this will increase the access time to private radio communications network 30 and also reduce monitoring features (such as may be useful for office network 14). An N in the order of 2 is suitable for use with the present invention although other values of N may also be successfully utilized and obtain the benefits of the present invention.

The PCH period for the wide area cellular network as discussed above can be increased up to 9 multi-frame periods. This also increases the access time for the wide area cellular network but if short message service delivery is the main purpose for dual page monitor, this may not be a limitation since short message service is generally not time critical. In such a case, mobile terminal 30 has to process a PCH transmission once every nine 51-frame multi-frames for the examples described herein corresponding to approximately once every two seconds. Furthermore, as discussed above, the effort for monitoring surrounding wide area cellular network base stations 16', 16" can be reduced considerably or even eliminated due to the restricted movements of mobile terminal 30 when in the private mode connected with private radio communications network 12. Each of these options may contribute to reducing power consumption by mobile terminal 30 during private mode.

Additional power consumption reductions can be obtained by entering mobile terminal 30 into the dual monitor mode only a portion of the time. Accordingly, most of the time mobile terminal 30 may be in a private sleep mode and only periodically enter the dual monitor mode for a short period of time to monitor both private radio communications network 12 and the wide area cellular network. This mode will be described further in connection with FIG. 9.

Figure 6:
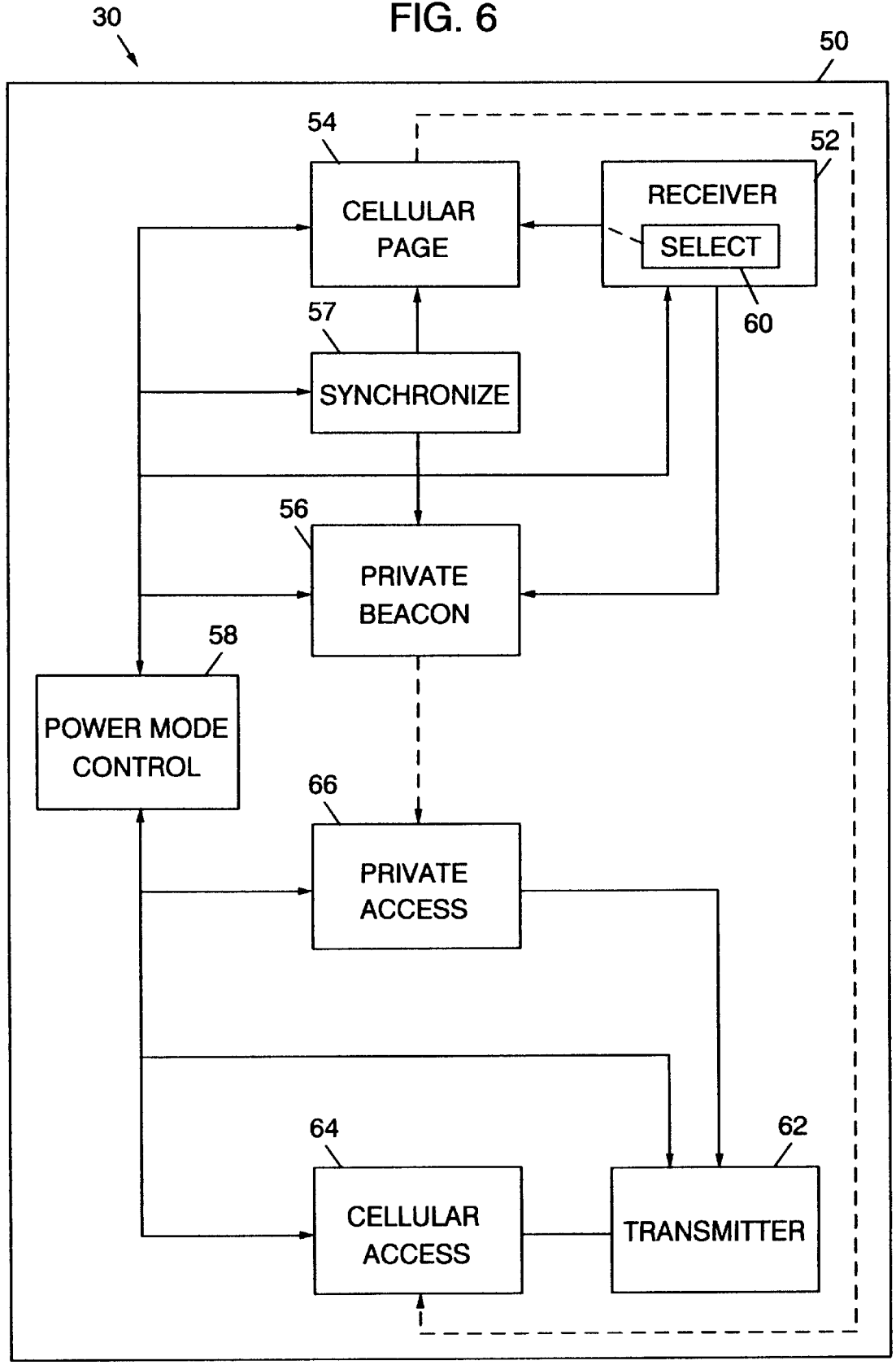
FIG. 6 is a schematic block diagram of a mobile terminal according to the present invention.

Referring now to FIG. 6, an embodiment of a mobile terminal 30 according to the present invention is illustrated. Mobile terminal 30 includes portable housing 50 or other housing means. Mobile terminal 30 is provided with means in housing 50 for concurrent receipt of incoming calls from both private radio communications network 12 paged through the beacon channel of private radio communications network 12 and from wide area cellular network base station 16 paged through the paging channel of base station 16. Mobile terminal 30 includes a receiver 52 or other receiving means for receiving the beacon channel of private radio communications network 12 and the paging channel transmitted by base station 16 of the wide area cellular network. Cellular page monitor circuit 54 or other page monitoring means for receiving paging messages from the wide area cellular network at a first predetermined time interval corresponding to the paging channel of the wide area cellular network is operatively connected to receiver 52. Private beacon monitor circuit 56 or other beacon monitoring means for monitoring beacon transmissions from private radio communications network 12 at a second predetermined time interval corresponding to the beacon channel of private radio communications network 12 and decoding received beacons is also operatively connected to receiver 52. Private radio communications network 12 may be a TDMA protocol radio communications network and the beacon channel for private radio communications network 12 may be a designated time slot or slots at a designated frequency. Alternatively, private radio communications network 12 may be an FDMA-based system, the beacon channel may be a repeating periodic transmission burst at a predetermined frequency.

Synchronize circuit 57 or other means for maintaining synchronization of mobile terminal 30 with both the wide area cellular network and private radio communications network 12 is operatively connected to cellular page monitoring circuit 54 and private beacon monitoring circuit 56. Synchronize circuit 57 synchronizes mobile terminal 30 to both networks so that mobile terminal 30 maintains synchronization and may continue to wake from sleep mode at the appropriate time to monitor for incoming calls on both networks. It is to be understood that synchronization of mobile terminal 30 by synchronize circuit 57 further provides for maintaining synchronization for communications access to both the wide area cellular network by circuit 64 and the private radio communications network 12 by circuit 66 when an incoming call is underway.

Power mode control circuit 58 or other power control means for controlling power usage by mobile terminal 30 is operatively connected to receiver 52, cellular page monitor circuit 54, and private beacon monitor circuit 56. Power mode control circuit 58 includes means for placing mobile terminal 30 in a first lower power sleep mode in which mobile terminal 30 does not communicate with private radio communications network 12 or the wide area cellular network and in a second higher power active mode in which mobile terminal 30 monitors for communications from private radio communications network 12 or the wide area cellular network at least during paging message or beacon transmission time intervals.

Power mode control circuit 58 enters the active mode responsive to cellular page monitor circuit 54 and private beacon monitor 56 at the first predetermined time interval corresponding to the paging channel of the wide area cellular network and the second predetermined time interval corresponding to the beacon channel of private radio communications network 12 responsive to signals from cellular page monitor circuit 54 and private beacon monitor circuit 56, respectively. In the active mode, power mode control circuit 58 provides power and, optionally, an indication to receiver 52 to enable receipt of radio communications by receiver 52. In addition, the active mode of power mode control circuit 58 may further provide additional power or signals to cellular page monitor circuit 54 and private beacon monitor circuit 56 to support additional operations by those circuits necessary for their respective monitor operations.

Select circuit 60, or other selecting means for selectively operatively connecting either cellular page monitor circuit 54 or private beacon monitor circuit 56 to receiver 52 when the first predetermined time interval and the second predetermined time interval conflict, is operatively connected to receiver 52. As illustrated in FIG. 6, select circuit 60 is part of receiver 52.

Mobile terminal 30 further contains means for receiving incoming calls or messages from the wide area cellular network or private radio communications network 12 when a monitored paging channel or beacon channel indicates an incoming call. Transmitter 62 or other transmitting means for transmitting radio communications to the wide area cellular network base station 16 or private radio communications network 12 is located within housing 50. Receiver 52 and transmitter 62 typically connect to antennas (not shown) extending within and from portable housing 50. Transmitter 62 provides for the transmit portion of two-way communications between mobile terminal 30 and the wide area cellular network or private radio communications network 12. It is to be understood that while receiver 52 and transmitter 62 are illustrated in FIG. 6 as separate circuits, they may be embodied as a transceiver providing both receiving and transmitting capabilities for uplink and downlink radio communications traffic.

Cellular access circuit 64 or other cellular network accessing means is operatively connected to transmitter 62. Cellular access circuit 64 provides means for accessing the wide area cellular network when a paging message is received by cellular page monitor circuit 54 indicating receipt of an incoming call on the wide area cellular network. While cellular network 64 as illustrated in FIG. 6 only indicates a connection to transmitter 62 and not receiver 52, it is to be understood that, in practice, cellular access circuit 64 will be operatively connected to receiver 52 to receive the incoming portions of an incoming call or message, as well as to transmitter 62 for providing outgoing call communications.

Private access circuit 66 or other private network accessing means for accessing private radio communications network 12 when a beacon transmission is received by private beacon monitor circuit 56 indicating receipt of an incoming call on private radio communications network 12 is also operatively connected to transmitter 62. Cellular access circuit 64 and private access circuit 66 access the wide area cellular network and private radio communications network 12, respectively, responsive to their associated monitor circuits 54, 56 as indicated by the connecting dotted lines between cellular page monitor circuit 54 and cellular access circuit 64 and private beacon monitor circuit 56 and private access circuit 66, shown in FIG. 6. As with cellular access circuit 64, it is to be understood that private access circuit 66, during an incoming call or message, would further be operatively connected to receiver 52 for receiving the incoming portion of a call from private radio communications network 12.

As illustrated in FIG. 6, transmitter 62, cellular access circuit 64, and private access circuit 66 are all operatively connected to power mode control circuit 58. Accordingly, power mode control circuit 58 may provide additional power or signals to transmitter 62, cellular access circuit 64, and private access circuit 66 in the higher power active mode to enable operation by these circuits when an incoming call is present. Likewise, in the lower power sleep mode, power mode control circuit 58 can reduce or eliminate power to transmitter 62, cellular access circuit 64, and private access circuit 66 to control power usage by mobile terminal 30. Power mode control circuit 58 may also provide reduced power to transmitter 62, cellular access circuit 64, and private access circuit 66 in the lower power sleep mode during idle frames of an ongoing call where there is neither incoming nor outgoing traffic.

As will be appreciated by those of skill in this art, the above-described aspects of the present invention in FIG. 6 may be provided by hardware, software, or a combination of the above. While the various components of mobile terminal 30 have been illustrated in FIG. 6 as discrete elements, they may in practice be implemented by a microcontroller including input and output ports and running software code, by custom or hybrid chips, by discrete components or by a combination of the above. For example, cellular page monitor circuit 54, private beacon monitor circuit 56, power mode control circuit 58, private access circuit 66, synchronize circuit 57, and cellular access circuit 64 could all be implemented as a single programmable device.

Figure 7:
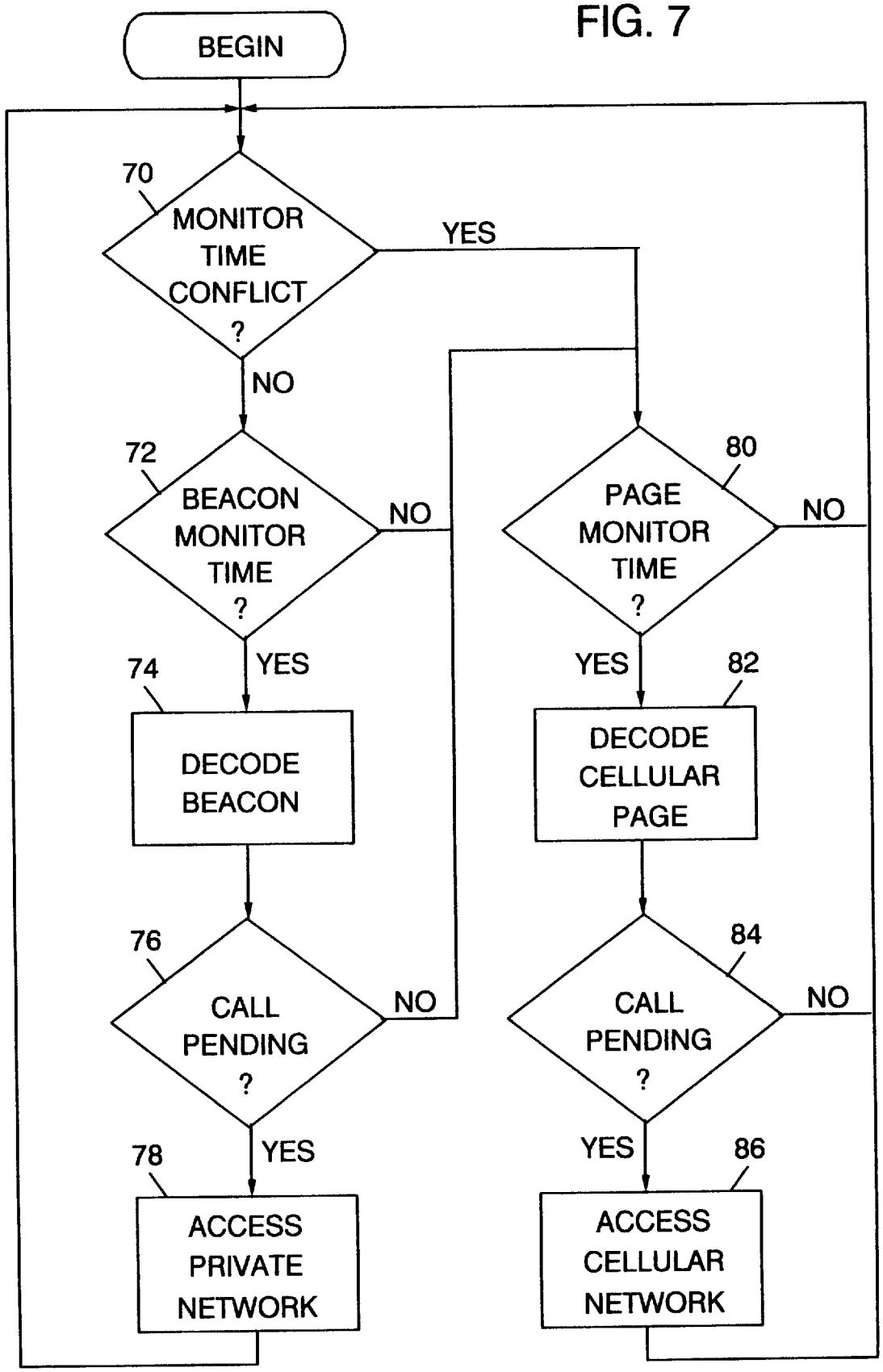
FIG. 7 is a flowchart illustrating operations of a mobile terminal according to the present invention.

Referring now to FIG. 7, an embodiment of the operations of the mobile terminal and method for concurrent receipt of incoming calls from both the private radio communications network 12 having a beacon channel and a wide area cellular network having a paging channel will be described. While mobile terminal 30 may be provided with redundant circuitry enabling monitoring for both a paging channel and a beacon channel at the same time slot, mobile terminal 30 generally does not include such redundant circuitry. Accordingly, as the interval of transmission of the paging channel and beacon channel are preferably at distinct intervals to avoid interference, mobile terminal 30 may be provided in the dual monitor mode with a means for preferentially monitoring either private radio communications network 12 or the wide area cellular network when a conflict occurs.

As illustrated in the embodiment of FIG. 7, if a monitor time conflict between the first predetermined time interval corresponding to the paging channel of the wide area cellular network and a second predetermined time interval corresponding to the beacon channel of private radio communications network 12 occurs at block 70, mobile terminal 30 detects the conflict and selects for execution monitoring for paging messages from the wide area cellular network. It is to be understood that, alternatively, monitoring for beacon transmissions could be given preference when the predetermined time intervals for the paging channel and beacon channel conflict.

At block 72, when no time conflict has been detected at block 70, mobile terminal 30 determines if it is at a predetermined time corresponding to the beacon channel of private radio communications network 12. If so, at block 74, mobile terminal 30 monitors and decodes beacon transmissions from private radio communications network 12. At block 76, mobile terminal 30 determines if the beacon transmission received at block 74 indicates receipt of an incoming call on private radio communications network 12. If so, at block 78, mobile terminal 30 accesses private radio communications network 12 to receive the incoming call. While mobile terminal 30 is receiving an incoming call from private radio communications network 12 at block 78, it typically may not monitor for incoming calls from the wide area cellular network. This is because the paging channel of the wide area cellular network is not typically aligned with an idle frame on the traffic connection between mobile terminal 30 and private radio communications network 12. Accordingly, the operations illustrated in FIG. 7 maintain in block 70 and do not return as illustrated in block 70 until the incoming call from private radio communications network 12 is complete and mobile terminal 30 is again able to resume dual monitor mode operations.

If it is not a beacon monitor time at block 72 or if no call is pending at block 76, mobile terminal 30 determines if it is at a predetermined time corresponding to the paging channel of the wide area cellular network at block 80. For the embodiment illustrated in FIG. 7, if a monitor time conflict is detected at block 70, operations at block 72, 74, 76, and 78 are bypassed and operations move directly from block 70 to block 80. If it is time to monitor for the paging channel at block 80, at block 82 mobile terminal 30 monitors and decodes paging messages from the wide area cellular network. At block 84, mobile terminal 30 determines if a paging message was received at block 82 indicating receipt of an incoming call or message on the wide area cellular network. If such an incoming call or message has been detected at block 86, mobile terminal 30 accesses the wide area cellular network to receive the incoming call or message. If it is determined that it is not the paging channel monitor time at block 80 or if no call is pending at block 84 or after accessing the wide area cellular network at block 86 and completing the call, operations return to block 70.

While an incoming call is underway at block 86 in FIG. 7, mobile terminal 30 typically does not listen to the paging channel of the wide area cellular network. Mobile terminal 30 may be able to continue to receive short message service message notification or call waiting information where these services are available and signaled through a dedicated slow access channel (SACCH) or fast access channel (FACCH). Optionally, mobile terminal 30 may continue to monitor for beacons from private radio communications network 12 where the beacons are transmitted during idle frames of the traffic channel of the wide area cellular network as illustrated in the embodiment shown in FIG. 4. If it is desired to continue monitoring for beacons while a call from the wide area cellular network is underway, mobile terminal 30 may continue to periodically carry out the operations illustrated in FIG. 7 at block 72, 74, 76, and 78. Otherwise, operations exit from block 86 after completion of the incoming call from the wide area cellular network at block 86.

As described previously in connection with FIG. 6, mobile terminal 30 is provided with a power saving sleep mode requiring mobile terminal 30 to wake up at block 74 and at block 82 to perform monitoring operations. Mobile terminal 30 may then return to the sleep mode if no incoming call has been received at block 76 or block 84.

It is to be understood from the flowchart of FIG. 7 that the dual monitor mode operations of the present invention repeat at predetermined time intervals. Accordingly, mobile terminal 30 over time periodically monitors for paging messages from the wide area cellular network at first predetermined time intervals corresponding to the paging channel timing of the wide area cellular network. Likewise, mobile terminal 30 periodically monitors for beacon transmissions from private radio communications network 12 at second predetermined time intervals corresponding to the beacon channel timing of private radio communications network 12. Mobile terminal 30 may enter a sleep mode to conserve mobile terminal power when mobile terminal 30 is not monitoring or accessing the wide area cellular network or private radio communications network 12.

When mobile terminal 30 is in private mode attached to private radio communications network 12, it is desirable for the wide area cellular network to know when mobile terminal 30 is monitoring for messages from the wide area cellular network and whether mobile terminal 30 wants to accept incoming cellular voice calls and/or short message service messages calls. Various optional modes for accessing incoming calls from the wide area cellular network when mobile terminal 30 is in the private mode will be described with reference to FIG. 8.

Figure 8:
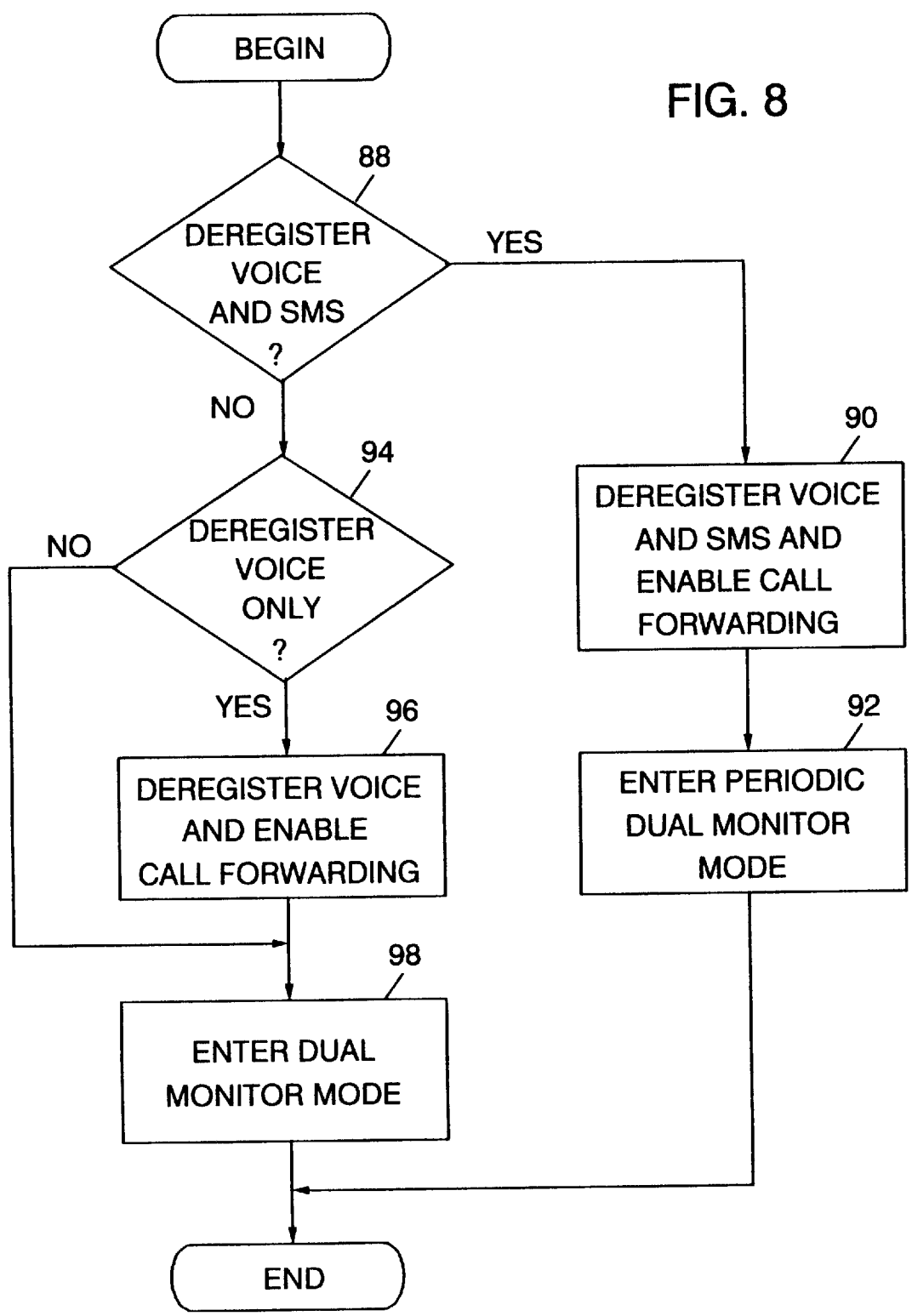
FIG. 8 is a flowchart illustrating operations following entering private mode according to an embodiment of the present invention.

Referring now to FIG. 8, operations of an embodiment of the present invention for providing notice to the wide area cellular network when mobile terminal 30 has attached to private radio communications network 12 are illustrated. While in the private mode, mobile terminal 30 may optionally maintain registration with the wide area cellular network and be registered to both the wide area cellular network and the private radio communications network 12. This option is illustrated in FIG. 8 at block 88 and 94 if the "no" operation is selected for both deregistration options and mobile terminal 30 enters dual monitor mode at block 98. Accordingly, incoming calls to the wide area cellular network number of mobile terminal 30 arrive at mobile terminal 30 through the wide area cellular network. Incoming calls to the wire line number of private radio communications network 12 arrive at mobile terminal 30 through private radio communications network 12. Using this option, mobile terminal 30 typically maintains dual monitor mode substantially all the time as incoming call messages from both networks generally expect mobile terminal 30 to be monitoring for pages/beacons while mobile terminal 30 is registered. Outgoing calls from mobile terminal 30 may, optionally, be preferentially directed through private radio communications network 12 to obtain the benefits discussed previously.

In an alternative embodiment also illustrated in FIG. 8, mobile terminal 30 may obtain additional power savings by entering the periodic dual monitor mode at block 92. As shown in FIG. 8, this mode is entered if deregister voice and SMS is selected at block 88. To do so, mobile terminal 30 deregisters from the wide area cellular network completely by deregistering for both voice calls and SMS message calls at block 90. Call forwarding from the wide area cellular network number of mobile terminal 30 to the wire line number of private radio communications network 12 may also be established for voice calls at block 90. At block 92, mobile terminal 30 enters periodic dual monitor mode. This mode will be described further in connection with FIG. 9.

In another embodiment, mobile terminal 30, on entering the private mode, may elect to deregister only for voice calls at block 94. Call forwarding from the wide area cellular network number of mobile terminal 30 to the wire line number of private radio communications network 12 may then be established after deregistering for voice calls at block 96. Incoming voice calls directed to the wide area cellular network may then be carried through private radio communications network 12. SMS call delivery can continue to be carried out through the wide area cellular network. Therefore, mobile terminal 30 maintains a dual monitor mode as it continues to be registered with the wide area cellular network for SMS delivery. Outgoing calls from mobile terminal 30 may, optionally, be preferentially routed through private radio communications network 12 to obtain the benefits discussed above.

Mobile terminal 30 may also deregister for voice and SMS calls at block 90 and continue dual monitor mode operations. However, preferably, if mobile terminal 30 is fully deregistered from the wide area cellular network, periodic dual monitor mode is entered to provide for improved power use by mobile terminal 30.

It is to be understood that mobile terminal 30 deregisters from the wide area cellular network for voice and/or SMS calls typically only if mobile terminal 30 is allowed access and attaches (registers) to a private radio communications network 12 so that mobile terminal 30 may enter the private mode. Of course, it is to be further understood that for reasons unrelated to the scope of the present invention, mobile terminal 30 may also be deregistered from the wide area cellular network.

Periodic dual monitor mode will now be described with reference to FIG. 9. In periodic dual monitor mode, mobile terminal 30 is typically in the private idle or sleep mode most of the time. However, at predetermined time intervals, mobile terminal 30 enters the dual monitor mode. Because mobile terminal 30 is deregistered from the wide area cellular network, entering dual monitor mode includes executing a cellular registration or location update with the wide area cellular network. Call forwarding may then, optionally, be canceled by mobile terminal 30 so that both voice calls and SMS calls may be received from the wide area cellular network. Alternatively, an option may be provided wherein mobile terminal 30 indicates as part of its cellular registration that it is not executing a normal cellular registration but simply a registration preceding a dual monitor period to receive SMS messages. In this case, call forwarding need not be canceled during the periodic dual monitor operations.

Figure 9:
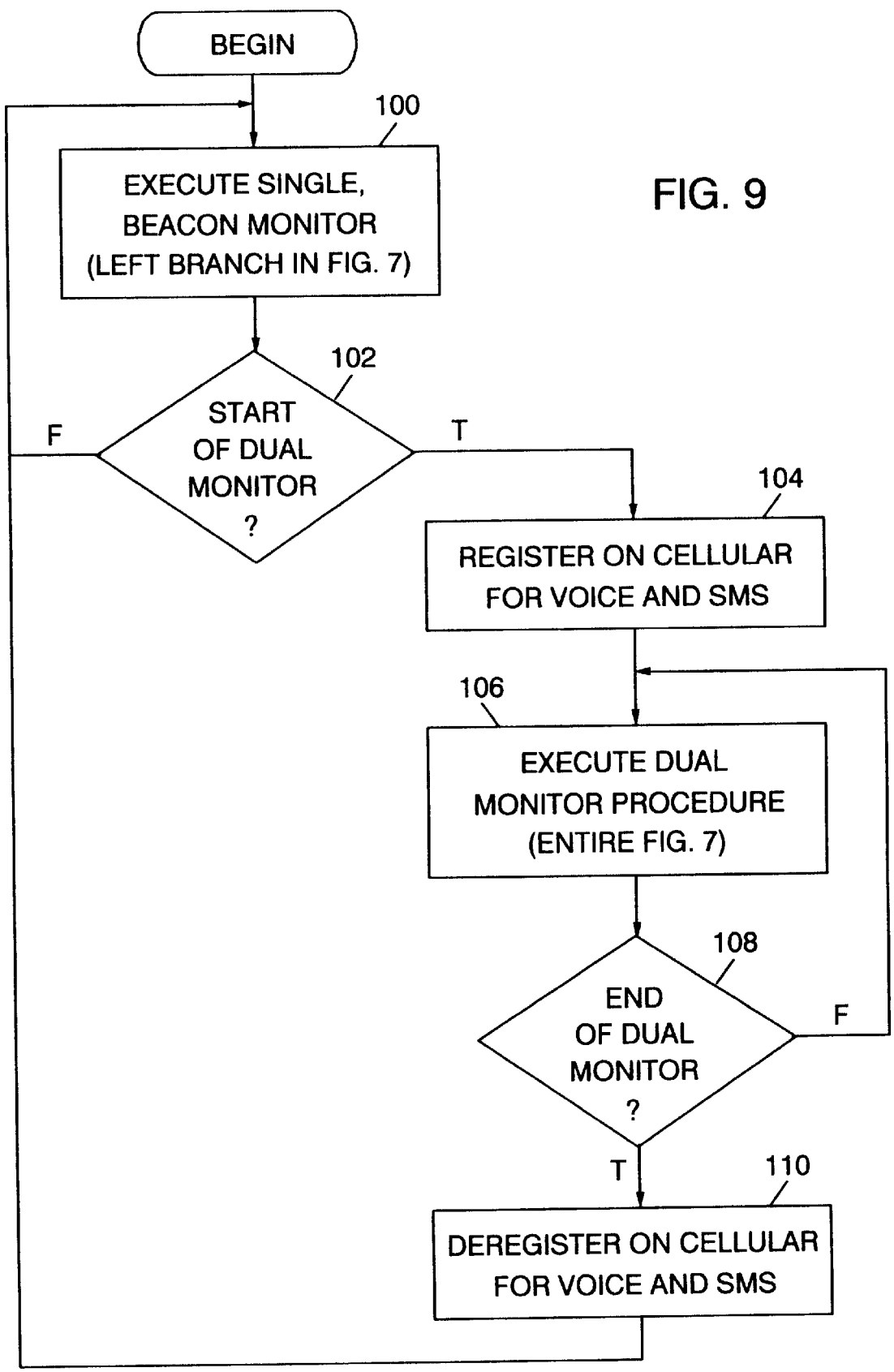
FIG. 9 is a flowchart illustrating an embodiment of periodic dual monitor operations for a mobile terminal in the private mode according to the present invention.

As illustrated in FIG. 9, mobile terminal 30 is periodically performing single monitor to determine if any incoming calls are indicated in beacon transmissions from private radio communications network 12 at block 100. Single monitor mode operations at block 100 are as described with respect to block 72, 74, 76, and 78 of FIG. 7. At block 102, mobile terminal 30 determines if it is time to switch to dual monitor mode. A predetermined time is selected for the period between entering dual monitor mode to define the periodic dual monitor mode operations. If a greater time period is selected, there is an opportunity for greater power savings in mobile terminal 30. However, a greater period between dual monitor periods effectively slows the access time of mobile terminal 30 for accessing messages or unforwarded calls on the wide area cellular network. If it is not time for dual monitor mode at block 102, mobile terminal 30 continues single monitor mode operations at block 100. When it is time to execute dual monitor mode at block 102, mobile terminal 30 registers on the wide area cellular network for voice and/or SMS at block 104. At block 106, mobile terminal 30 executes dual monitor mode operations as described generally for FIG. 7.

At block 108, dual monitor mode operations at block 106 are continued until the end of the dual monitor period. As with the period between entering dual monitor modes, a predetermined time may be selected for the duration of the periodic dual monitor modes. When the predetermined time period for the dual monitor operations in periodic dual monitor mode is completed at block 108, mobile terminal 30 deregisters for voice and SMS messages from the wide area cellular network at block 110. It is to be understood that the deregister operation at block 110 as with that described at the corresponding block 90 of FIG. 8 may also include requesting call forwarding. Mobile terminal 30 then resumes single monitor mode at block 100.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for concurrent receipt by a mobile terminal of incoming calls from both a private radio communications network having a beacon channel and a wide area cellular network having a paging channel, comprising the steps of:

monitoring for paging messages from the wide area cellular network at a first predetermined time interval corresponding to the paging channel of the wide area cellular network;

monitoring for beacon transmissions from the private radio communications network at a second predetermined time interval corresponding to the beacon channel of the private radio communications network;

selecting between executing said monitoring for paging messages step and said monitoring for beacon transmissions step when said first predetermined time interval and said second predetermined time interval conflict;

accessing the wide area cellular network when a paging message is received in said monitoring for paging messages step indicating receipt of an incoming call on said wide area cellular network; and, accessing the private radio communications network when a beacon transmission is received in said monitoring for beacon transmissions step indicating receipt of an incoming call on said private radio communications network.

2. The method of claim 1 wherein said selecting step includes the step of selecting for execution said step of monitoring for paging messages when said first predetermined time interval and said second predetermined time interval conflict.

3. The method of claim 1 wherein the mobile terminal has a sleep mode and wherein the mobile terminal wakes up at the first predetermined time interval to execute said monitoring for paging messages step and at said second predetermined time interval to execute said monitoring for beacon transmissions step.

4. The method of claim 3 wherein said monitoring for paging messages step is followed by the step of returning the mobile terminal to the sleep mode if no paging message is received indicating receipt of an incoming call on said wide area cellular network.

5. The method of claim 3 wherein said monitoring for beacon transmissions step is followed by the step of returning the mobile terminal to the sleep mode if no beacon is received indicating receipt of an incoming call on said private radio communications network.

6. The method of claim 1 wherein said monitoring for paging messages step is preceded by the step of registering with the wide area cellular network for at least one of voice calls or short message service messages.

7. The method of claim 6 wherein the private radio communications network has an associated wire line number and wherein said registering step includes the step of registering for voice calls and wherein said monitoring for beacon transmissions step is followed by the steps of:

deregistering from the wide area cellular network for voice calls; and, forwarding voice calls from the wide area cellular network to the wire line number of the private radio communications network.

8. The method of claim 7 wherein said deregistering step is followed by the step of monitoring for short message service transmissions from said wide area cellular network at a predetermined short message service transmission time.

9. The method of claim 6 wherein said deregistering step further includes the step of deregistering from the wide area cellular network for short message service messages.

10. The method of claim 9 wherein said step of deregistering from the wide area cellular network for short message service messages is followed by the steps of:

suspending monitoring for paging messages from the wide area cellular network for a period of time; then, registering with the wide area cellular network; and then monitoring for paging messages from the wide area cellular network.

11. A method for concurrent receipt by a mobile terminal having a sleep mode of incoming calls from both a private radio communications network having a beacon channel and a wide area cellular network having a paging channel, comprising the steps of:

periodically monitoring for paging messages from the wide area cellular network at first predetermined time intervals corresponding to the paging channel timing of the wide area cellular network;

periodically monitoring for beacon transmissions from the private radio communications network at second predetermined time intervals corresponding to the beacon channel timing of the private radio communications network;

selecting between executing said periodically monitoring for paging messages step and said periodically monitoring for beacon transmissions step when said first predetermined time interval and said second predetermined time interval conflict;

accessing the wide area cellular network when a paging message is received in said periodically monitoring for paging messages step indicating receipt of an incoming call on said wide area cellular network;

accessing the private radio communications network when a beacon transmission is received in said periodically monitoring for beacon transmissions step indicating receipt of an incoming call on said private radio communications network; and, entering the sleep mode to conserve mobile terminal power when the mobile terminal is not performing said steps of monitoring or accessing the wide area cellular network or the private radio communications network.

12. A mobile terminal for concurrent receipt of incoming calls from both a private radio communications network having a beacon channel and a wide area cellular network having a paging channel, comprising:

receiving means for receiving said beacon channel and for receiving said paging channel;

page monitoring means operatively connected to said receiving means for receiving paging messages from said wide area cellular network at a first predetermined time interval corresponding to said paging channel of said wide area cellular network;

beacon monitoring means operatively connected to said receiving means for monitoring beacon transmissions from said private radio communications network at a second predetermined time interval corresponding to said beacon channel of said private radio communications network; and, power control means responsive to at least one of said page monitoring means or said beacon monitoring means, said power control means comprising means for placing said mobile terminal in a lower power sleep mode in which said mobile terminal does not communicate with said private radio communications network or said wide area cellular network and means for placing said mobile terminal in a higher power active mode in which said mobile terminal monitors for communications from said private radio communications network or said wide area cellular network, at least during said first predetermined time interval or said second predetermined time interval.

13. The mobile terminal of claim 12 further comprising selecting means operatively connected to said receiving means for selectively operatively connecting either said page monitoring means or said beacon monitoring means to said receiving means when said first predetermined time and said second predetermined time conflict.

14. The mobile terminal of claim 12 further comprising:

transmitting means for transmitting radio communications to said wide area cellular network and said private radio communications network;

cellular network accessing means operatively connected to said transmitting means and responsive to said page monitoring means for accessing said wide area cellular network when a paging message is received by said page monitoring means indicating receipt of an incoming call on said wide area cellular network; and, private network accessing means operatively connected to said transmitting means and responsive to said beacon monitoring means for accessing said private radio communications network when a beacon transmission is received by said beacon monitoring means indicating receipt of an incoming call on said private radio communications network.

15. A mobile terminal for concurrent receipt of incoming calls from both a private radio communications network having a beacon channel and a wide area cellular network having a paging channel, comprising:

transceiver means for transmitting and receiving radio communications;

means operatively connected to said transceiver means for monitoring for paging messages from the wide area cellular network at a first predetermined time interval corresponding to the paging channel of the wide area cellular network;

means operatively connected to said transceiver means for monitoring for beacon transmissions from the private radio communications network at a second predetermined time interval corresponding to the beacon channel of the private radio communications network;

means operatively connected to said transceiver means for accessing the wide area cellular network when a paging message is received in said monitoring for paging messages step indicating receipt of an incoming call on said wide area cellular network; and, means operatively connected to said transceiver means for accessing the private radio communications network when a beacon transmission is received in said monitoring for beacon transmissions step indicating receipt of an incoming call on said private radio communications network.

16. The mobile terminal of claim 15 further comprising means operatively connected to said means for monitoring for paging messages and said means for monitoring for beacon transmissions for selecting between executing said monitoring for paging messages step and said monitoring for beacon transmissions step when said first predetermined time interval and said second predetermined time interval conflict.

17. The mobile terminal of claim 16 further comprising power control means operatively connected to said means for monitoring for paging messages and said means for monitoring for beacon transmissions for placing said mobile terminal in a sleep mode and for placing said mobile terminal in a relatively higher power active mode during said first predetermined time interval to monitor for paging messages and during said second predetermined time interval to monitor for said beacon transmissions.

18. The mobile terminal of claim 16 wherein said first predetermined time interval and said second predetermined time interval slide relative to each other.

* * * * *

UNITED STATES PATENT AND TRADEMARK OFFICE
CERTIFICATE OF CORRRECTION

PATENT NO. : 5,870,673
DATED : February 9, 1999
INVENTOR(S) : Jacobus Cornelis Haartsen It is certified that error appears in the above-identified patent and that said Letters Patent is hereby corrected as shown below:

On the title page, under item [63], insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 4 | 7 | 0 | 3 | 3 | 2 | 4 10/27/87 | White | | | |
| | | | | | | | | | | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 2 | 2 | 6 | 4 | 8 | 4 | 2 A | 09/08/93 | UK | | | | |
| | | | | | | | | | | | | | |

FOREIGN PATENT OR PUBLISHED FOREIGN PATENT APPLICATION

Cell Selection Information, Radio Resource Management, pp. 425-429

Signed and Sealed this

Ninth Day of November, 1999

Attest:

Attesting Officer

Q. TODD DICKINSON

Acting Commissioner of Patents and Trademarks

EX PARTE REEXAMINATION CERTIFICATE (4865th)
United States Patent
Haartsen

(10) Number: US 5,870,673 C1
(45) Certificate Issued: Oct. 14, 2003

(54) METHODS AND SYSTEMS FOR CONCURRENT RECEIPT OF INCOMING CALLS FROM A WIDE AREA CELLULAR NETWORK AND A PRIVATE RADIO COMMUNICATIONS NETWORK

(75) Inventor: Jacobus Cornelis Haartsen, Staffanstorp (SE)

(73) Assignee: Telefonaktiebolaget L.M. Ericsson, Stockholm (SE)

Reexamination Request:
No. 90/005,751, Jun. 16, 2000

Reexamination Certificate for:
Patent No.: 5,870,673
Issued: Feb. 9, 1999
Appl. No.: 08/708,035
Filed: Aug. 30, 1996

Certificate of Correction issued Nov. 9, 1999.

(51) Int. Cl.⁷ .............................. A63B 69/00; H04B 7/00
(52) U.S. Cl. .................... 455/426.1; 455/434; 455/462; 455/464; 455/466; 455/552.1; 455/574
(58) Field of Search ................................. 455/422, 432, 455/433, 434, 435, 445, 458, 460, 462, 426, 161.1, 161.2, 161.3

(56) References Cited

U.S. PATENT DOCUMENTS 5,239,306 A   8/1993   Siwiak et al.

FOREIGN PATENT DOCUMENTS

| EP | 0 674 454 | 9/1995 |
|----|-----------|--------|
| GB | 2 269 723 | 2/1994 |
| WO | WO 94 00946 | 1/1994 |

*Primary Examiner*—Thanh Cong Le

(57) ABSTRACT

Concurrent receipt of incoming calls from both a private radio communications network connected to a public switched telephone network and a wide area cellular network also connected to the public switched telephone network are provided by a radio communications mobile terminal supporting concurrent receipt of incoming calls from the two uncoordinated networks. The mobile terminal wakes up from a lower power sleep mode to monitor for paging messages on the paging channel of the wide area cellular network. The mobile terminal also wakes up to monitor for beacon transmissions from the private radio communications network on the beacon channel of the private radio communications network. When incoming calls are indicated as pending in either network, the mobile terminal accesses the network having an incoming call and receives the call. The mobile terminal may optionally deregister from the wide area cellular network when it establishes access to a private radio communications network and only periodically wake up from its lower power sleep mode to monitor for incoming calls on both the wide area cellular network and the private radio communications network.

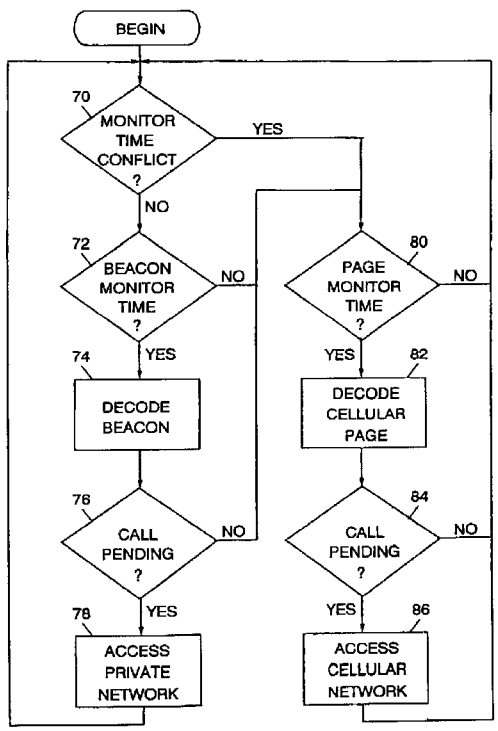

1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–8 and 11–14 is confirmed.

Claim 15 is cancelled.

Claims 9 and 16 are determined to be patentable as amended.

Claims 10, 17 and 18, dependent on and amended claim, are determined to be patentable.

9. The method of claim [6] *7* wherein said deregistering step further includes the step of deregistering from the wide area cellular network for short message service messages.

16. A [The] *A* mobile terminal [of claim 15 further conprising] *for concurrent receipt of incoming calls from both a private radio communications network having a beacon channel and a wide area cellular network having a paging channel, comprising:*

*transceiver means for transmitting and receiving radio communications;*

*means operatively connected to said transceiver means for monitoring for paging messages from the wide area cellular network at a first predetermined time interval corresponding to the paging channel of the wide area cellular network;*

*means operatively connected to said transceiver means for monitoring for beacon transmissions from the private radio communications network at a second predetermined time interval corresponding to the beacon channel of the private radio communications network;*

*means operatively connected to said transceiver means for accessing the wide area cellular network when a paging message is received in said monitoring for paging messages step indicating receipt of an incoming call on said wide area cellular network;*

*means operatively connected to said transceiver means for accessing the private radio communications network a beacon transmission is received ins aid monitoring for beacon transmissions step indicating receipt of an incoming call on said private radio communications network; and* means operatively connected to said means for monitoring for paging messages and said means for monitoring for beacon transmissions for selecting between executing said monitoring for paging messages step and said monitoring for beacon transmissions step when said first predetermined time interval and said second predetermined time interval conflict.

\* \* \* \* \*